(12) United States Patent
Greer

(10) Patent No.: US 7,680,766 B2
(45) Date of Patent: Mar. 16, 2010

(54) METHOD AND APPARATUS FOR ADDING A DATABASE PARTITION

(75) Inventor: Kevin Glen Roy Greer, Mississauga (CA)

(73) Assignee: Redknee Inc. (CA)

( * ) Notice: Subject to any disclaimer, the term of this patent is extended or adjusted under 35 U.S.C. 154(b) by 320 days.

(21) Appl. No.: 11/693,305

(22) Filed: Mar. 29, 2007

(65) Prior Publication Data

US 2008/0243961 A1 Oct. 2, 2008

(51) Int. Cl.
*G06F 17/30* (2006.01)

(52) U.S. Cl. .......................................... 707/2; 707/200

(58) Field of Classification Search ......... 707/200–206, 707/2, 101
See application file for complete search history.

(56) References Cited

U.S. PATENT DOCUMENTS

| | | | | |
|---|---|---|---|---|
| 5,710,915 | A | * | 1/1998 | McElhiney .................... 707/3 |
| 5,878,409 | A | | 3/1999 | Baru et al. |
| 6,101,495 | A | * | 8/2000 | Tsuchida et al. ............... 707/4 |
| 6,405,198 | B1 | * | 6/2002 | Bitar et al. .................... 707/6 |
| 2004/0199533 | A1 | | 10/2004 | Celis et al. |

OTHER PUBLICATIONS

Furtado, P., "Hash-based Placement and Processing for Efficient Node Partitioned Query-Intensive Databases", International Conference on Parallel And Distributed Systems, Jul. 7-9, 2004, pp. 127-134.*
Furtado, P., "Hash-based Placement and Processing for Efficient Node Partitioned Query-Intensive Databases", Proceeding of the Tenth International Conference on Parallel and Distributed Systems (ICPADS 2004), Jul. 7-9, 2004, pp. 127-134.
International Search Report for International Patent Application PCT/CA2008/000496.
Written Opinion of the International Searching Authority for International Patent Application PCT/CA2008/000496.

* cited by examiner

*Primary Examiner*—Cheryl Lewis
(74) *Attorney, Agent, or Firm*—Perry + Currier Inc.; T. Andrew Currier; Stephen J. Perry

(57) ABSTRACT

A data repository system and method are provided. A method in accordance with an embodiment includes an operation that can be used to port data from one or more existing database partitions to new database partitions according to a minimally progressive hash. The method can be used to increase the overall size of databases while a system runs hot, with little or no downtime.

14 Claims, 6 Drawing Sheets

Solid boxes indicate data that needs to be moved as the number of partitions increase (from left to right).
Empty boxes indicate no movement of data.

| N= | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Key: 0 | 1 | 2 | 2 | 2 | 2 | 2 | 7 | 7 | 7 | 7 | 7 | 7 | 7 | 7 | 7 | 7 | 7 | 7 |
| Key: 1 | 1 | 2 | 2 | 2 | 2 | 2 | 2 | 2 | 2 | 2 | 2 | 2 | 2 | 2 | 2 | 2 | 2 | 2 |
| Key: 2 | 1 | 1 | 3 | 3 | 3 | 6 | 6 | 6 | 6 | 6 | 6 | 6 | 6 | 6 | 6 | 6 | 6 | 6 |
| Key: 3 | 1 | 1 | 1 | 1 | 1 | 1 | 1 | 1 | 1 | 1 | 1 | 1 | 1 | 1 | 1 | 1 | 1 | 1 |
| Key: 4 | 1 | 1 | 1 | 4 | 5 | 5 | 5 | 5 | 5 | 5 | 5 | 5 | 5 | 5 | 5 | 5 | 5 | 5 |
| Key: 5 | 1 | 2 | 2 | 2 | 2 | 2 | 2 | 2 | 2 | 2 | 2 | 2 | 2 | 2 | 2 | 2 | 2 | 2 |
| Key: 6 | 1 | 1 | 3 | 3 | 3 | 3 | 3 | 8 | 8 | 8 | 8 | 8 | 13 | 13 | 13 | 13 | 13 | 13 |
| Key: 7 | 1 | 1 | 3 | 3 | 3 | 3 | 7 | 7 | 7 | 7 | 7 | 7 | 7 | 15 | 15 | 15 | 15 | 15 |
| Key: 8 | 1 | 1 | 1 | 1 | 1 | 6 | 6 | 6 | 6 | 6 | 6 | 6 | 6 | 6 | 6 | 6 | 6 | 6 |
| Key: 9 | 1 | 1 | 1 | 1 | 5 | 5 | 5 | 5 | 9 | 9 | 11 | 11 | 11 | 14 | 14 | 14 | 14 | 14 |
| Key: 10 | 1 | 2 | 3 | 3 | 3 | 6 | 6 | 6 | 6 | 6 | 6 | 6 | 6 | 6 | 6 | 6 | 6 | 6 |
| Key: 11 | 1 | 2 | 2 | 2 | 5 | 5 | 5 | 5 | 5 | 5 | 5 | 5 | 5 | 5 | 5 | 5 | 5 | 5 |
| Key: 12 | 1 | 2 | 2 | 4 | 4 | 6 | 6 | 6 | 6 | 6 | 6 | 6 | 6 | 6 | 6 | 16 | 16 | 16 |
| Key: 13 | 1 | 1 | 3 | 3 | 3 | 3 | 3 | 3 | 3 | 3 | 3 | 3 | 3 | 3 | 3 | 3 | 3 | 3 |
| Key: 14 | 1 | 2 | 2 | 2 | 2 | 6 | 7 | 8 | 9 | 10 | 10 | 12 | 12 | 12 | 12 | 12 | 12 | 12 |
| Key: 15 | 1 | 2 | 3 | 3 | 3 | 3 | 3 | 3 | 3 | 3 | 11 | 11 | 11 | 11 | 11 | 11 | 11 | 11 |
| Key: 16 | 1 | 2 | 2 | 2 | 2 | 2 | 7 | 7 | 7 | 7 | 11 | 11 | 11 | 11 | 11 | 11 | 11 | 11 |
| Key: 17 | 1 | 2 | 2 | 2 | 2 | 2 | 2 | 8 | 8 | 8 | 8 | 8 | 8 | 8 | 8 | 8 | 17 | 17 |
| Key: 18 | 1 | 1 | 3 | 3 | 5 | 5 | 7 | 8 | 9 | 10 | 10 | 10 | 10 | 10 | 10 | 10 | 10 | 10 |
| Key: 19 | 1 | 1 | 3 | 3 | 3 | 6 | 6 | 6 | 6 | 10 | 11 | 12 | 13 | 14 | 15 | 16 | 16 | 16 |
| Key: 20 | 1 | 1 | 3 | 3 | 3 | 3 | 3 | 3 | 3 | 3 | 3 | 3 | 3 | 3 | 3 | 3 | 3 | 3 |
| Key: 21 | 1 | 2 | 3 | 4 | 4 | 4 | 4 | 4 | 4 | 4 | 4 | 4 | 4 | 4 | 4 | 4 | 17 | 17 |
| Key: 22 | 1 | 1 | 1 | 1 | 1 | 1 | 1 | 1 | 1 | 1 | 1 | 1 | 1 | 1 | 1 | 1 | 1 | 1 |
| Key: 23 | 1 | 1 | 1 | 1 | 1 | 1 | 1 | 1 | 1 | 1 | 1 | 1 | 1 | 1 | 1 | 1 | 1 | 1 |
| Key: 24 | 1 | 1 | 1 | 1 | 1 | 1 | 1 | 1 | 1 | 1 | 1 | 1 | 1 | 1 | 1 | 1 | 1 | 1 |
| Key: 25 | 1 | 1 | 1 | 1 | 5 | 5 | 5 | 5 | 5 | 5 | 5 | 5 | 5 | 14 | 14 | 14 | 17 | 17 |
| Key: 26 | 1 | 2 | 2 | 2 | 2 | 2 | 2 | 8 | 8 | 8 | 8 | 8 | 8 | 8 | 8 | 8 | 8 | 8 |
| Key: 27 | 1 | 2 | 3 | 4 | 4 | 6 | 6 | 8 | 8 | 8 | 8 | 8 | 8 | 8 | 8 | 8 | 8 | 8 |

Fig. 5A

| Key: 28 | 1 | 2 | 2 | 2 | 2 | 2 | 2 | 8 | 8 | 8 | 11 | 11 | 11 | 11 | 11 | 11 | 11 | 11 |
|---|---|---|---|---|---|---|---|---|---|---|---|---|---|---|---|---|---|---|
| Key: 29 | 1 | 1 | 3 | 3 | 3 | 3 | 3 | 8 | 8 | 8 | 11 | 11 | 11 | 11 | 11 | 11 | 17 | 17 |
| Key: 30 | 1 | 2 | 3 | 4 | 5 | 6 | 6 | 6 | 9 | 9 | 9 | 9 | 9 | 14 | 14 | 14 | 14 | 14 |
| Key: 31 | 1 | 2 | 2 | 4 | 4 | 4 | 4 | 4 | 9 | 9 | 9 | 9 | 9 | 9 | 9 | 9 | 9 | 9 |
| Key: 32 | 1 | 2 | 3 | 3 | 5 | 5 | 5 | 5 | 5 | 5 | 5 | 5 | 5 | 5 | 5 | 5 | 5 | 5 |
| Key: 33 | 1 | 2 | 2 | 4 | 4 | 4 | 4 | 4 | 4 | 4 | 4 | 4 | 4 | 4 | 16 | 16 | 16 |
| Key: 34 | 1 | 1 | 3 | 3 | 3 | 6 | 6 | 6 | 6 | 10 | 10 | 10 | 10 | 10 | 10 | 10 | 10 | 10 |
| Key: 35 | 1 | 2 | 2 | 2 | 2 | 2 | 2 | 2 | 2 | 2 | 2 | 2 | 2 | 2 | 2 | 2 | 2 | 2 |
| Key: 36 | 1 | 1 | 1 | 4 | 5 | 5 | 5 | 5 | 5 | 5 | 5 | 5 | 5 | 5 | 5 | 5 | 5 | 5 |
| Key: 37 | 1 | 2 | 3 | 4 | 4 | 6 | 6 | 8 | 8 | 8 | 11 | 11 | 11 | 11 | 11 | 11 | 11 | 11 |
| Key: 38 | 1 | 1 | 1 | 4 | 4 | 4 | 4 | 4 | 4 | 4 | 4 | 13 | 13 | 13 | 13 | 13 | 13 |
| Key: 39 | 1 | 1 | 1 | 1 | 1 | 1 | 7 | 7 | 7 | 7 | 11 | 11 | 11 | 11 | 15 | 15 | 15 | 15 |
| Key: 40 | 1 | 1 | 1 | 1 | 1 | 6 | 7 | 8 | 9 | 10 | 10 | 10 | 10 | 10 | 10 | 10 | 10 | 10 |
| Key: 41 | 1 | 1 | 3 | 3 | 3 | 3 | 7 | 7 | 9 | 9 | 9 | 9 | 9 | 9 | 9 | 9 | 9 | 9 |
| Key: 42 | 1 | 2 | 2 | 4 | 5 | 6 | 6 | 6 | 6 | 6 | 12 | 12 | 12 | 12 | 12 | 12 | 12 | 12 |
| Key: 43 | 1 | 1 | 1 | 4 | 4 | 4 | 4 | 4 | 4 | 4 | 4 | 4 | 4 | 4 | 4 | 4 | 4 | 4 |
| Key: 44 | 1 | 2 | 3 | 3 | 3 | 3 | 3 | 3 | 3 | 3 | 3 | 3 | 3 | 3 | 3 | 3 | 3 | 3 |
| Key: 45 | 1 | 1 | 1 | 1 | 1 | 1 | 1 | 1 | 1 | 1 | 1 | 1 | 1 | 1 | 1 | 1 | 17 | 17 |
| Key: 46 | 1 | 2 | 3 | 4 | 4 | 4 | 4 | 4 | 9 | 9 | 9 | 9 | 9 | 15 | 15 | 15 | 15 |
| Key: 47 | 1 | 2 | 2 | 2 | 2 | 2 | 8 | 8 | 8 | 8 | 8 | 8 | 8 | 8 | 8 | 8 | 8 |
| Key: 48 | 1 | 2 | 3 | 3 | 3 | 3 | 7 | 7 | 7 | 7 | 7 | 7 | 7 | 7 | 16 | 16 | 16 |
| Key: 49 | 1 | 2 | 3 | 3 | 3 | 3 | 3 | 3 | 3 | 3 | 3 | 3 | 3 | 3 | 3 | 3 | 18 |
| Moved: | 0 | 26 | 21 | 13 | 9 | 12 | 9 | 11 | 8 | 5 | 8 | 3 | 3 | 4 | 4 | 4 | 5 | 1 |

Fig. 5B

METHOD AND APPARATUS FOR ADDING A DATABASE PARTITION

FIELD OF THE INVENTION

The present invention relates to data management and more particularly relates to a method and apparatus for adding a database partition.

BACKGROUND OF THE INVENTION

Increased reliance on computers and networks has likewise increased the need for high-availability and scalability of such computers and networks. One specific example is wireless telecommunications. In a wireless telecommunication network, the network must be available twenty-four hours a day, creating the need for maintenance and upgrades to be performed while the network is running "hot", and with minimal disruption in quality of service. As new services and/or subscribers are continuously added to the network, existing database hardware will eventually need to be replaced and upgraded. Data from existing hardware must then be migrated to the new hardware, again with minimal disruption in quality of service.

SUMMARY OF THE INVENTION

An aspect of the specification provides a method for adding a database partition comprising:
- determining an existing number of partitions;
- examining each existing partition to determine which portion of each existing partition is to be transferred according to a minimally progressive hash operation;
- adding a new partition; and,
- transitioning portions of existing partitions to said new partition according to the determinations made during said examining step.

The hashing operation is selected from a class of partitioning algorithms that substantially maintain a maximum, or substantially maximum, consistency between consecutive partition sizes.

The method can be repeated until a desired number of partitions have been added.

Another aspect of the specification provides a computer readable medium that stores programming instructions that implements the method.

BRIEF DESCRIPTION OF THE DRAWINGS

FIGS. 5A and 5B show the data in FIG. 4 in tabular format.

DETAILED DESCRIPTION OF THE EMBODIMENTS

Figure 1:
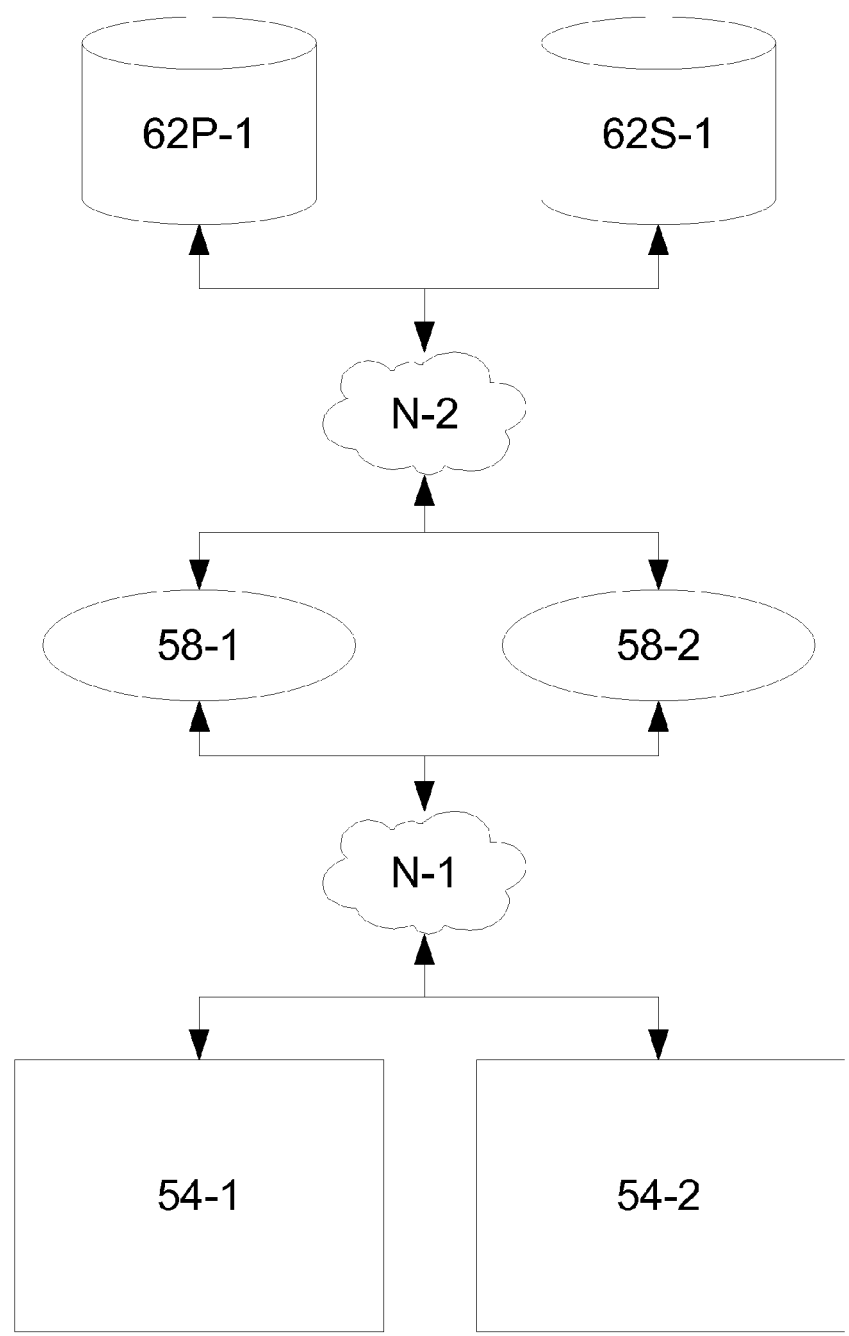
FIG. 1 shows a data repository system in accordance with an embodiment.

Referring now to FIG. 1, a data repository system is indicated generally at 50. In a present embodiment, system 50 is presented in the context of a wireless telecommunications system, but it is to be understood that system 50 can be varied to other contexts. System 50 comprises a plurality of service control points ("SCPs") 54-1, 54-2 (collectively, SCPs 54, and generically, SCP 54.). SCPs 54 are connected, via a network N-1, to a plurality of applications 58-1, 58-2 (collectively, applications 58, and generically, application 58). Applications 58 are, in turn, are serviced, via a second network N-2, by one or more primary databases 62P which in turn can be backed-up by one or more secondary databases 62S service data points. (Collectively, databases 62 and generically, databases 66). However, those skilled in the art will recognize that secondary databases 62S can be omitted altogether. Those skilled in the art will also now recognize that applications 58 and databases 62 can be collectively referred to as service data points (SDPs). While the present embodiment, includes specific reference to network N-1 and SCPs 54, it will become apparent that network N-1 and SCPs 54 can be omitted altogether, or SCPs can simply be any type of client machine that is accessing applications 58. Networks N-1 and N-2 are comprised of any network infrastructure components that are used to implement desired physically interconnections, and can, in fact be implemented on a single network. In the present embodiment, network N-1 is implemented via SS7 network infrastructure, whereas network N-2 is implemented via a local area network or a wide area network based on Internet protocols.

Applications 58 can be any type of application that is currently known (or is developed in the future) that would serve data stored in databases 62 to SCPs 54. A well known example of an application 58 is an application to route 1-800-numbers to a traditional area code and phone number. Other examples for applications 58 include customer resource management, cross-service bundling, location services and rating, Virtual Private Networking, Prepaid billing, Missed Call Return, Loyalty Reward and Promotion Programs, Fraud Management, Policy Management, Call Screening and Redirection, and Subscriber Profile Management.

Databases 62 include the infrastructure to store, retrieve and manage data, including hardware to store the data and a database application layer, such as the Structured Query Language ("SQL") or the like, to interface between each database 62 and each application 58.

Figure 2:
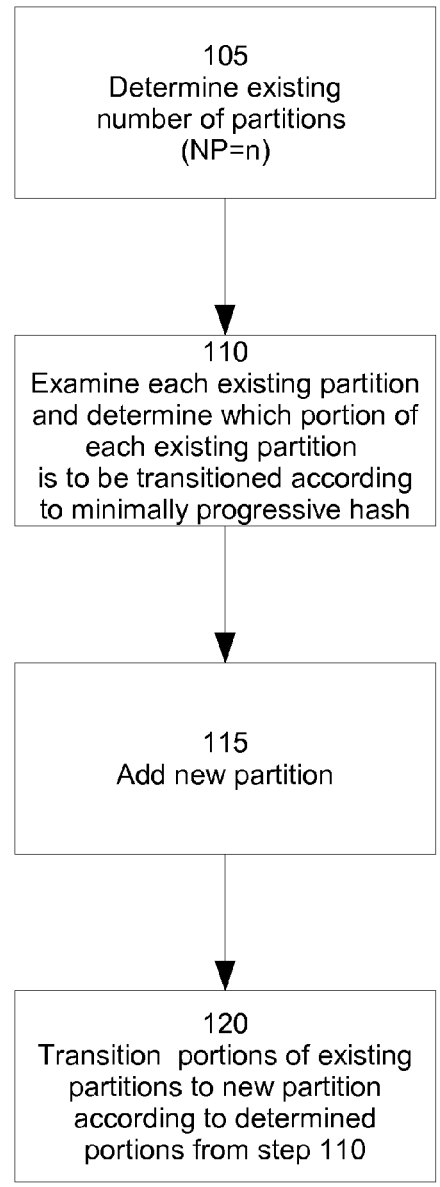
FIG. 2 shows a flowchart depicting a method of adding a database partition.

Referring now to FIG. 2, a method for adding a database partition is represented in a flowchart indicated generally at 100. Method 100 can be performed on a variety of different systems, but in order to assist in explanation of system 50 and method 100, it will be assumed that method 100 is performed using system 50.

Figure 3:
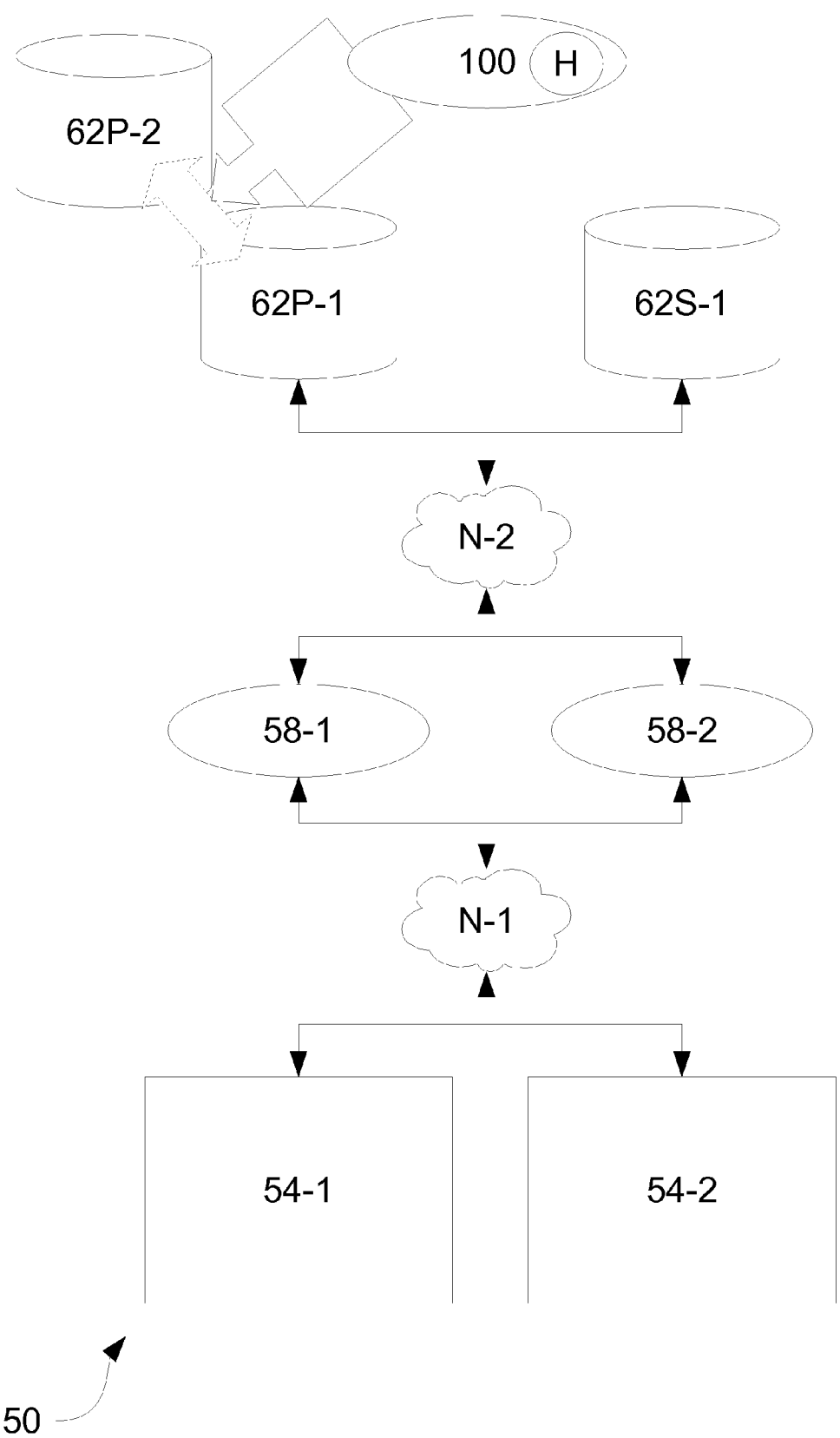
FIG. 3 shows a representation of the addition of a database partition to the system of FIG. 1 using the method in FIG. 2.

In the present embodiment, database 62P-1 represents a single partition and that database 62B-1 represents a single partition. Thus, to give a concrete example of the performance of method 100, it will be assumed that database partition 62P-1 is full and that a second database partition 62P-2 is being added to database partition 62P-1. Method 100 can be implemented on any suitable computing environment (e.g. a server) with physical connections to each database partition 62P in order to examine the existing partitions 62P and determine how to move data on the existing partition(s) to the new partition. FIG. 3 shows a representation of method 100, drawn as an oval, operating on database partition 62P-1 so as to add database partition 62P-2. (Though not shown, method 100 would likewise apply to the addition of a second database partition to database partition 62B-1).

Beginning at step 105 in FIG. 2, a determination is made as to the existing number of partitions. In the present example, it is determined that only one database partition 62P-1 currently exists. Next, at step 110, each existing partition is examined to determine which portion of each existing partition is to be transitioned to the new partition according to a minimally progressive hashing operation. The minimally progressive hashing operation is represented as an oval indicated at "H" in FIG. 3. In the present example, database partition 62P-1 would be examined and, assuming database partition 62P-1 was full, then hashing operation H would determine that half of the data thereon would be identified as a candidate for moving to new partition 62P-2. Hashing operation H would likewise identify which exact portions would be candidates for moving.

Next, at step 115, the new partition would be added. In the present example database partition 62P-2 would become physically and operationally attached to and integrated with partition 62P-1, such that each application 58 would perceive both partitions 62P-1 and 62P-2 to be a single database 62P, such that each application 58 would continue to interact with partitions 62P in the same manner as one partition 62P.

Next, at step 115, the new partition would be added. In the present example database partition 62P-2 would become physically attached to partition 62P-1. Next, at step 120, portions of the existing database will be ported from the existing partition(s) to the new partition in accordance with the determinations made by hashing operation H at step 110. At the conclusion of performance of step 120, application 58 would perceive both partitions 62P-1 and 62P-2 to be a single database 62P, such that each application 58 would continue to interact with partitions 62P in the same manner as one partition 62P.

It is contemplated that during the performance of steps 115 and 120, each application 58 will be able to access database 62P in such a manner that, where an application 58 expects to find data on the second database partition 62P-2 as it would expect to find such data at the conclusion of the performance of step 120, then that application 58 will initially look for that data on the second database partition 62P-2, and, where that data is not found, then that application 58 will look for that data on the first database partition 62P-1. An exemplary mechanism for accomplishing this is as follows: Application 58 first attempts to find the data as though the migration to database 62P-2 had already been completed. If the data is not found by application 58 then application 58 would try to find the data again, but instead using the same method that application 58 used before database 62P-2 were added. A more sophisticated mechanism can be made aware of the progress of the data migration to database 62P-2 so that application 58 would know whether a particular piece of data had been migrated, or not.

It will now be understood that method 100 can be used to add any number of partitions (not shown in the Figures) to database partitions 62P-1 and 62P-2, or to database 62B. It should also be understood that hashing operation H can be implemented in a variety of ways. Hashing operation H can be selected from a class of partitioning algorithms that share the unusual property that they substantially maintain a maximum, or substantially maximum, consistency between consecutive partition sizes. An example of one hashing operation H is provided in Appendix I in the form of pseudo-code and referred to as hashing operation H-1.

Table I shows the progression of movement of data as method 100 is performed eight times, each time adding a new partition, using hashing operation H-1, so that at the conclusion database 62P has a total of nine partitions referred to herein as 62P-1, 62P-2, . . . 62P-9. In Table I, the term "Key" refers to the index or other pointer that identifies each portion of the database partition. Thus, each partition in the example of Table I has nineteen portions. It will be understood, however, that in other embodiments each partition can be divided into other portion sizes. The partition number beside each key indicates the location of the portion of data associated with that corresponding Key. Each "*" indicates that the portion corresponding to the * was moved during the previous performance of method 100 by hashing operation H-1.

TABLE I

Results of performing method 100 nine times using hashing operation H-1

Zero performances of method 100
Partition Size: 1
(Only Partition 62P-1)

Key10 : Partition 62P-1
Key11 : Partition 62P-1
Key12 : Partition 62P-1
Key13 : Partition 62P-1
Key14 : Partition 62P-1
Key15 : Partition 62P-1
Key16 : Partition 62P-1
Key17 : Partition 62P-1
Key18 : Partition 62P-1
Key19 : Partition 62P-1
Key20 : Partition 62P-1
Key21 : Partition 62P-1
Key22 : Partition 62P-1
Key23 : Partition 62P-1
Key24 : Partition 62P-1
Key25 : Partition 62P-1
Key26 : Partition 62P-1
Key27 : Partition 62P-1
Key28 : Partition 62P-1
Key29 : Partition 62P-1
First performance of method 100
Partition Size: 2
(Partition 62P-2 is added)

Key10 : Partition 62P-2 *
Key11 : Partition 62P-1
Key12 : Partition 62P-2 *
Key13 : Partition 62P-1
Key14 : Partition 62P-2 *
Key15 : Partition 62P-1
Key16 : Partition 62P-2 *
Key17 : Partition 62P-1
Key18 : Partition 62P-2 *
Key19 : Partition 62P-1
Key20 : Partition 62P-1
Key21 : Partition 62P-2 *
Key22 : Partition 62P-1
Key23 : Partition 62P-2 *
Key24 : Partition 62P-1
Key25 : Partition 62P-2 *
Key26 : Partition 62P-1
Key27 : Partition 62P-2 *
Key28 : Partition 62P-1
Key29 : Partition 62P-2 *
Second performance of method 100
Partition Size: 3
(Partition 62P-3 is added)

Key10 : Partition 62P-2
Key11 : Partition 62P-1
Key12 : Partition 62P-3 *
Key13 : Partition 62P-1
Key14 : Partition 62P-2
Key15 : Partition 62P-3 *
Key16 : Partition 62P-2
Key17 : Partition 62P-1
Key18 : Partition 62P-3 *
Key19 : Partition 62P-1
Key20 : Partition 62P-1
Key21 : Partition 62P-3 *
Key22 : Partition 62P-1
Key23 : Partition 62P-2
Key24 : Partition 62P-3 *

TABLE I-continued

Results of performing method 100 nine times using hashing operation H-1

Key25 : Partition 62P-2
Key26 : Partition 62P-1
Key27 : Partition 62P-3 *
Key28 : Partition 62P-1
Key29 : Partition 62P-2
Third performance of
method 100
Partition Size: 4
(Partition 62P-4 is added)

Key10 : Partition 62P-2
Key11 : Partition 62P-1
Key12 : Partition 62P-4 *
Key13 : Partition 62P-1
Key14 : Partition 62P-2
Key15 : Partition 62P-3
Key16 : Partition 62P-4 *
Key17 : Partition 62P-1
Key18 : Partition 62P-3
Key19 : Partition 62P-1
Key20 : Partition 62P-1
Key21 : Partition 62P-3
Key22 : Partition 62P-1
Key23 : Partition 62P-4 *
Key24 : Partition 62P-3
Key25 : Partition 62P-2
Key26 : Partition 62P-1
Key27 : Partition 62P-4 *
Key28 : Partition 62P-1
Key29 : Partition 62P-2
Fourth performance of
method 100
Partition Size: 5
(Partition 62P-5 is added)

Key10 : Partition 62P-2
Key11 : Partition 62P-5 *
Key12 : Partition 62P-4
Key13 : Partition 62P-1
Key14 : Partition 62P-2
Key15 : Partition 62P-3
Key16 : Partition 62P-5 *
Key17 : Partition 62P-1
Key18 : Partition 62P-3
Key19 : Partition 62P-1
Key20 : Partition 62P-5 *
Key21 : Partition 62P-3
Key22 : Partition 62P-1
Key23 : Partition 62P-4
Key24 : Partition 62P-3
Key25 : Partition 62P-5 *
Key26 : Partition 62P-1
Key27 : Partition 62P-4
Key28 : Partition 62P-1
Key29 : Partition 62P-2
Fifth performance of
method 100
Partition Size: 6
(Partition 62P-6 is added)

Key10 : Partition 62P-2
Key11 : Partition 62P-5
Key12 : Partition 62P-6 *
Key13 : Partition 62P-1
Key14 : Partition 62P-2
Key15 : Partition 62P-3
Key16 : Partition 62P-5
Key17 : Partition 62P-1
Key18 : Partition 62P-6 *
Key19 : Partition 62P-1
Key20 : Partition 62P-5
Key21 : Partition 62P-6 *
Key22 : Partition 62P-1
Key23 : Partition 62P-4
Key24 : Partition 62P-3
Key25 : Partition 62P-5
Key26 : Partition 62P-1

TABLE I-continued

Results of performing method 100 nine times using hashing operation H-1

Key27 : Partition 62P-6 *
Key28 : Partition 62P-1
Key29 : Partition 62P-2
Sixth performance of
method 100
Partition Size: 7
(Partition 62P-7 is added)

Key10 : Partition 62P-2
Key11 : Partition 62P-7 *
Key12 : Partition 62P-6
Key13 : Partition 62P-1
Key14 : Partition 62P-2
Key15 : Partition 62P-3
Key16 : Partition 62P-5
Key17 : Partition 62P-1
Key18 : Partition 62P-7 *
Key19 : Partition 62P-1
Key20 : Partition 62P-5
Key21 : Partition 62P-6
Key22 : Partition 62P-1
Key23 : Partition 62P-4
Key24 : Partition 62P-3
Key25 : Partition 62P-7 *
Key26 : Partition 62P-1
Key27 : Partition 62P-6
Key28 : Partition 62P-1
Key29 : Partition 62P-2
Seventh performance of
method 100
Partition Size: 8
(Partition 62P-8 is added)

Key10 : Partition 62P-2
Key11 : Partition 62P-7
Key12 : Partition 62P-8 *
Key13 : Partition 62P-1
Key14 : Partition 62P-2
Key15 : Partition 62P-3
Key16 : Partition 62P-5
Key17 : Partition 62P-1
Key18 : Partition 62P-7
Key19 : Partition 62P-1
Key20 : Partition 62P-5
Key21 : Partition 62P-6
Key22 : Partition 62P-1
Key23 : Partition 62P-8 *
Key24 : Partition 62P-3
Key25 : Partition 62P-7
Key26 : Partition 62P-1
Key27 : Partition 62P-6
Key28 : Partition 62P-1
Key29 : Partition 62P-2
Eighth performance of
method 100
Partition Size: 9
(Partition 62P-9 is added)

Key10 : Partition 62P-2
Key11 : Partition 62P-7
Key12 : Partition 62P-9 *
Key13 : Partition 62P-1
Key14 : Partition 62P-2
Key15 : Partition 62P-3
Key16 : Partition 62P-5
Key17 : Partition 62P-1
Key18 : Partition 62P-7
Key19 : Partition 62P-1
Key20 : Partition 62P-5
Key21 : Partition 62P-6
Key22 : Partition 62P-1
Key23 : Partition 62P-8
Key24 : Partition 62P-3
Key25 : Partition 62P-7
Key26 : Partition 62P-1
Key27 : Partition 62P-9 *

TABLE I-continued

Results of performing method 100 nine times using hashing operation H-1

Key28 : Partition 62P-1
Key29 : Partition 62P-2

Another example of a hashing operation H is provided in Appendix 2 and referred to as hashing operation H-2.

Figure 4:
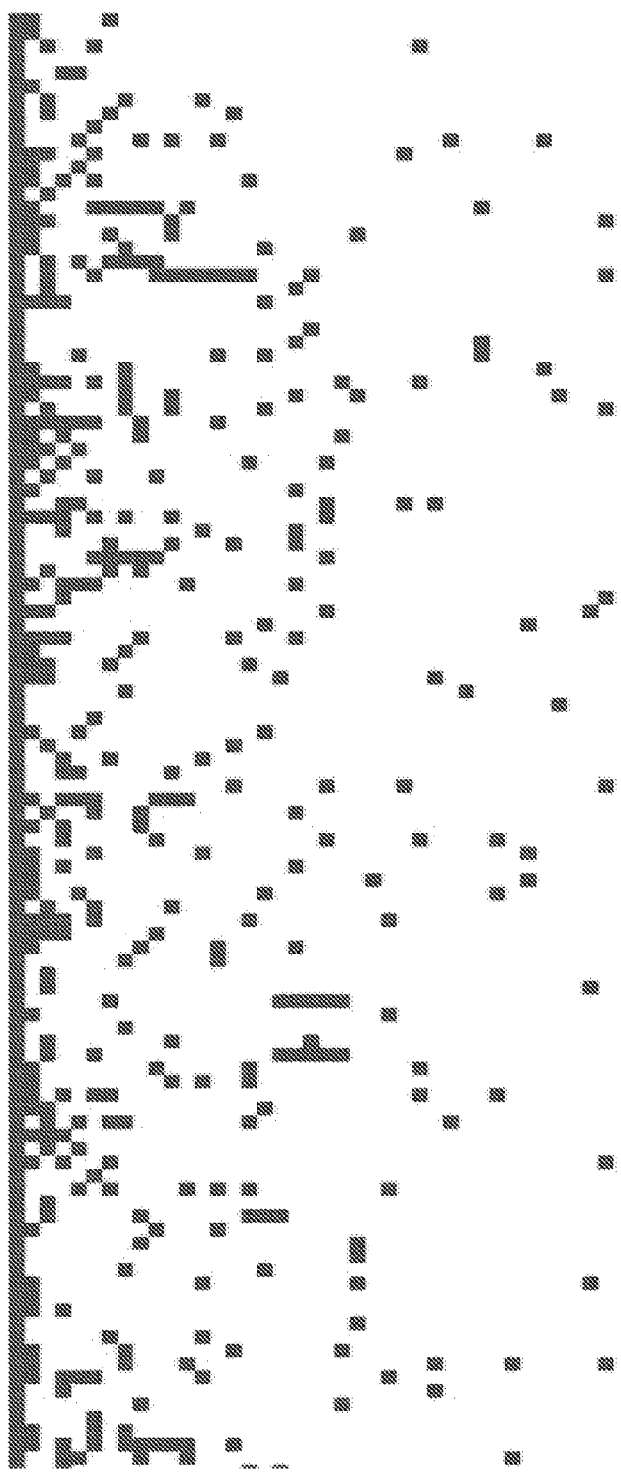
FIG. 4 is a graph showing the data that needs to be moved during performance of the method in FIG. 2 using a particular hashing operation.

FIG. 4 shows the progression of movement of data as method 100 is performed using hashing operation H-2, so that at the conclusion database 62P has a total of eighteen partitions. Each row in FIG. 4 represents a key. Each column represents the addition of a new partition. Squares in a given row indicate that the data represented by this row need to be transitioned to a new partition as part of the migration caused by adding the new node represented by the corresponding column. The first column is solid because all data needed to be written into the first partition. Moving across a row shows at which partition size increases a particular piece of data needed to be moved to the new partition. Reading down a row shows which keys were copied into the new partition when the new partition was created. FIGS. 5A and 5B are another representation of FIG. 4, except that FIGS. 5A and 5B also show to which partition each key is allocated at each point in time.

Varieties of permutations, combinations, variations and/or subsets of the embodiments discussed herein are contemplated and will now occur to those skilled in the art. For example, system 50 can be varied for environments other than telecommunications, in which case databases 62 that serve applications 58, can in turn service any type of client machine, and not just SCPs 54.

APPENDIX I

Pseudo-code for hashing operation H-1

```
define function part(hash, 1) -> (1, hash)
define function part(hash, size) -> (partition, remainder) as
    let (partition, remainder) = part(hash, size-1)
    if remainder mod size = 0 then
        return (size, remainder / size)
    else
        return (partition, remainder * (size-1) / size)
    end
end function
define function part(key) -> partition
    return part(hashValueOf(key), current_partition_size) end function
```
The second 'part' function above is limited by the growth of the 'factorial' function. As such, it can only be used for partition sizes up to 20.

APPENDIX II

Pseudo-code for hashing operation H-2

A more complicated version is listed below which instead relies of the LCM (lowest common multiple) instead of the factorial. As a result hashing operation H-2 is suitable for partition sizes of up to 42.
```
define function part(hash, size) -> (partition, remainder) as
    let (partition, remainder)  = part(hash, size-1)
    let new_LCM                 = lcm(1..size)
    let old_LCM                 = lcm(1..size-1)
    let number_per_old          = new_LCM / size
    let steals_per_old          = number_per_old / (size-1)
    let cycle                   = remainder / (new_LCM / (size-1))
```

APPENDIX II-continued

Pseudo-code for hashing operation H-2

```
    let cycle_remainder  = remainder mod (new_LCM / (size-1))
    let cycle_steal      = max(0, 1 + cycle_remainder −
                           number_per_old)
    if cycle_steal > 0 then
        return (size, (partition − 1) * steals_per_old +
cycle_steal − 1 + cycle * number_per_old)
    else
        return (partition, cycle * number_per_old + cycle_remainder)
    end
end function
Examples:
part("john smith",5) -> 3
part("sue smith", 5) -> 2
part("555-1234", 20) -> 15
part("555-2345", 20) -> 4
```

The invention claimed is:

1. A method for adding a database partition comprising:
  determining an existing number of partitions;
  adding at least one new partition to said existing number of partitions;
  examining each existing partition to determine which portion of each existing partition is to be transferred according to a minimally progressive hash operation; said minimally progressive hash operation configured to identify at least one portion to be transferred based on: a hash of an identifier of said at least one portion, said existing number of partitions and a second number of partitions resulting from adding said at least one new partition;
  transitioning said at least one portion to said new partition according to the determination made during said examining step.

2. The method of claim 1 wherein said hashing operation is selected from a class of partitioning algorithms that substantially maintain a maximum, or substantially maximum, consistency between consecutive partition sizes.

3. The method of claim 1 wherein said method is repeated until a desired number of partitions have been added.

4. The method of claim 1 wherein said hashing operation is implemented according to the following pseudo-code:

```
define function part(hash, 1) -> (1, hash)
define function part(hash, size) -> (partition, remainder) as
    let (partition, remainder) = part(hash, size-1)
    if remainder mod size = 0 then
        return (size, remainder / size)
    else
        return (partition, remainder * (size-1) / size)
    end
end function
define function part(key) -> partition
    return part(hashValueOf(key), current_partition_size) end function.
```

5. The method of claim 1 wherein said hashing operation is implemented according to the following pseudo-code:

```
define function part(hash, size) -> (partition, remainder) as
let (partition, remainder) = part(hash, size-1)
let new_LCM       = lcm(1..size)
let old_LCM       = lcm(1..size-1)
let number_per_old = new_LCM / size
let steals_per_old = number_per_old / (size-1)
let cycle         = remainder / (new_LCM / (size-1))
```

-continued

```
let cycle_remainder  = remainder mod (new_LCM / (size−1))
let cycle_steal      = max(0, 1 + cycle_remainder − number_per_old)
    if cycle_steal > 0 then
        return (size, (partition − 1) * steals_per_old + cycle_steal −
1 + cycle * number_per_old)
    else
        return (partition, cycle * number_per_old + cycle_remainder)
    end
end function.
```

6. A computer-based apparatus for adding a database partition comprising an interface for connection to an existing database; a processor configured to a determine an existing number of partitions in said database and to examine each existing partition in said database to further determine which portion of each existing partition of said database is to be transferred according to a minimally progressive hash operation; said processor further configured to add at least one new partition to said existing database and to transitioning portions of existing partitions to said new partition according to the determinations made during said examining step, wherein said minimally progressive hash operation is configured to identify at least one portion to be transferred based on: a hash of an identifier of said at least one portion, said existing number of partitions and a second number of partitions resulting from said adding at least one new partition to said existing number of partitions.

7. The apparatus of claim 6 wherein said hashing operation is selected from a class of partitioning algorithms that substantially maintain a maximum, or substantially maximum, consistency between consecutive partition sizes.

8. The apparatus of claim 6 wherein said hashing operation is implemented according to the following pseudo-code:

```
define function part(hash, 1) −> (1, hash)
define function part(hash, size) −> (partition, remainder) as
    let (partition, remainder) = part(hash, size−1)
    if remainder mod size = 0 then
        return (size, remainder / size)
    else
        return (partition, remainder * (size−1) / size)
    end
end function
define function part(key) −> partition
    return part(hashValueOf(key), current_partition_size) end function.
```

9. The apparatus of claim 6 wherein said hashing operation is implemented according to the following pseudo-code:

```
define function part(hash, size) −> (partition, remainder) as
    let (partition, remainder) = part(hash, size−1)
    let new_LCM         = lcm(1..size)
    let old_LCM         = lcm(1..size−1)
    let number_per_old  = new_LCM / size
    let steals_per_old  = number_per_old / (size−1)
    let cycle           = remainder / (new_LCM / (size−1))
    let cycle_remainder = remainder mod (new_LCM / (size−1))
    let cycle_steal     = max(0, 1 + cycle_remainder −
number_per_old)
        if cycle_steal > 0 then
            return (size, (partition − 1) * steals_per_old +
cycle_steal − 1 + cycle * number_per_old)
        else
            return (partition, cycle * number_per_old + cycle_remainder)
        end
end function.
```

10. A computer readable media storing a plurality of programming instructions; said programming instructions executable by a computing apparatus; said programming instructions configured to implement a method for adding a database partition comprising:
  determining an existing number of partitions;
  adding at least one new partition to said existing number of partitions;
  examining each existing partition to determine which portion of each existing partition is to be transferred according to a minimally progressive hash operation;
  said minimally progressive hash operation configured to identify at least one portion to be transferred based on: a hash of an identifier of said at least one portion, said existing number of partitions and a second number of partitions resulting from adding said at least one new partition;
  transitioning portions of existing partitions to said new partition according to the determinations made during said examining step.

11. The computer readable media of claim 10 wherein said hashing operation is selected from a class of partitioning algorithms that substantially maintain a maximum, or substantially maximum, consistency between consecutive partition sizes.

12. The computer readable media of claim 10 wherein said method is repeated until a desired number of partitions have been added.

13. The computer readable media of claim 10 wherein said hashing operation is implemented according to the following pseudo-code:

```
define function part(hash, 1) −> (1, hash)
define function part(hash, size) −> (partition, remainder) as
    let (partition, remainder) = part(hash, size−1)
if remainder mod size = 0 then
    return (size, remainder/size)
else
    return (partition, remainder * (size−1)/size)
end
end function
define function part( key) −> partition
    return part(hashValueOf (key), current_partition_size) end
function.
```

14. The computer readable media of claim 10 wherein said hashing operation is implemented according to the following pseudo-code:

```
define function part(hash, size) −> (partition, remainder) as
    let (partition, remainder) = part(hash, size−1)
    let new_LCM         = lcm(1..size)
    let old_LCM         = lcm(1..size−1)
    let number_per_old  = new_LCM / size
    let steals_per_old  = number_per_old / (size−1)
    let cycle           = remainder / (new_LCM / (size−1))
    let cycle_remainder = remainder mod (new_LCM / (size−1))
    let cycle_steal     = max(0, 1 + cycle_remainder −
number_per_old)
        if cycle_steal > 0 then
            return (size, (partition − 1) * steals_per_old +
cycle_steal − 1 + cycle * number_per_old)
        else
            return (partition, cycle * number_per_old + cycle_remainder)
        end
end function.
```

* * * * *